United States Patent
Kölhi et al.

(10) Patent No.: US 12,489,953 B2
(45) Date of Patent: Dec. 2, 2025

(54) SYSTEMS AND METHODS FOR LEVERAGING MACHINE LEARNING TO ENABLE USER-SPECIFIC REAL-TIME INFORMATION SERVICES FOR IDENTIFIABLE OBJECTS WITHIN A VIDEO STREAM

(71) Applicant: Adeia Guides Inc., San Jose, CA (US)

(72) Inventors: Johan Kölhi, Vaxholm (SE); Anthony Friede, Upplands Väsby (SE); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/102,233

(22) Filed: Jan. 27, 2023

(65) Prior Publication Data

US 2024/0259640 A1 Aug. 1, 2024

(51) Int. Cl.
| | |
|---|---|
| *H04N 21/4722* | (2011.01) |
| *G06V 10/74* | (2022.01) |
| *G06V 10/764* | (2022.01) |
| *H04N 21/658* | (2011.01) |

(52) U.S. Cl.
CPC ....... *H04N 21/4722* (2013.01); *G06V 10/761* (2022.01); *G06V 10/764* (2022.01); *H04N 21/6581* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 6,408,128 B1* | 6/2002 | Abecassis | G11B 27/034 348/E7.071 |
| 8,782,701 B2 | 7/2014 | Yu et al. | |
| 9,270,515 B1* | 2/2016 | Postelnicu | H04N 21/23424 |
| 9,510,044 B1 | 11/2016 | Pereira et al. | |
| 9,716,914 B1* | 7/2017 | McCarty | H04N 21/4542 |
| 10,304,564 B1 | 5/2019 | Reicher | |
| 10,440,324 B1* | 10/2019 | Lichtenberg | G10L 19/018 |
| 10,719,301 B1* | 7/2020 | Dasgupta | G06F 8/34 |
| 10,887,664 B2 | 1/2021 | Gupta | |

(Continued)

FOREIGN PATENT DOCUMENTS

EP 3809673 A1 4/2021

OTHER PUBLICATIONS

International Search Report and Written Opinion of PCT/US2024/012681 dated May 29, 2024.
U.S. Appl. No. 18/102,230, filed Jan. 27, 2023, Johan Kölhi.

*Primary Examiner* — An Son P Huynh

(74) *Attorney, Agent, or Firm* — HALEY GUILIANO LLP

(57) ABSTRACT

A first content type of a first media stream being output is determined, and at least one first classification model is selected based on the first content type. Objects are identified in the first media stream using the at least one first classification model and information related to the objects is generated for presentation. A change in output of media streams from the first media stream to a second media stream may then be detected. A second content type of the second media stream is then determined and at least one second classification model is selected based on the second content type. Objects are then identified in the second media stream using the at least one second classification model and information related to the objects in generated for presentation.

20 Claims, 9 Drawing Sheets

(56) References Cited

U.S. PATENT DOCUMENTS

| | | |
|---|---|---|
| 10,990,850 B1 | 4/2021 | Chen et al. |
| 10,999,331 B1* | 5/2021 | Marchand ............ H04L 65/1073 |
| 11,120,293 B1 | 9/2021 | Rosenzweig et al. |
| 11,354,900 B1* | 6/2022 | Li ............................ G06V 10/56 |
| 11,381,551 B2* | 7/2022 | Thomas ................ H04L 67/303 |
| 11,418,647 B1* | 8/2022 | Peterson ............. H04M 3/5175 |
| 11,558,672 B1* | 1/2023 | Clasen ................ H04N 21/4122 |
| 11,776,273 B1* | 10/2023 | Chen ....................... G06N 20/20 382/224 |
| 11,962,840 B2* | 4/2024 | Yoden .................. G06F 3/04883 |
| 11,991,413 B2* | 5/2024 | Gupta .................. H04N 21/4826 |
| 12,143,659 B2* | 11/2024 | Moran ................... G06F 1/1601 |
| 12,184,921 B2* | 12/2024 | Gu ...................... H04N 21/43637 |
| 2003/0149975 A1 | 8/2003 | Eldering et al. |
| 2004/0194131 A1* | 9/2004 | Ellis ......................... H04N 21/47 725/35 |
| 2005/0028194 A1* | 2/2005 | Elenbaas ............... G06F 16/735 725/132 |
| 2007/0154169 A1 | 7/2007 | Cordray et al. |
| 2009/0202114 A1* | 8/2009 | Morin ..................... A63F 13/12 382/118 |
| 2011/0069940 A1* | 3/2011 | Shimy ................. H04N 21/4532 386/296 |
| 2011/0145856 A1 | 6/2011 | Agarwal et al. |
| 2012/0090000 A1* | 4/2012 | Cohen ................ H04N 21/8355 725/32 |
| 2012/0311635 A1 | 12/2012 | Mushkatblat |
| 2013/0031582 A1* | 1/2013 | Tinsman ............. H04N 21/4316 725/36 |
| 2013/0036200 A1* | 2/2013 | Roberts ............... H04L 65/1093 709/219 |
| 2013/0036442 A1* | 2/2013 | Wingert ........... H04N 21/42209 725/60 |
| 2013/0169546 A1* | 7/2013 | Thomas ............... G06F 3/04883 345/173 |
| 2013/0170813 A1* | 7/2013 | Woods ................... H04N 5/765 386/E5.002 |
| 2013/0173765 A1* | 7/2013 | Korbecki ......... H04N 21/42209 709/221 |
| 2014/0029913 A1* | 1/2014 | Lopez ............... H04N 21/41265 386/E5.052 |
| 2014/0068692 A1* | 3/2014 | Archibong ......... H04N 21/6334 725/116 |
| 2015/0007225 A1* | 1/2015 | Strong ................. H04N 19/597 725/74 |
| 2015/0070516 A1* | 3/2015 | Shoemake ......... H04N 21/4542 348/207.11 |
| 2015/0093093 A1* | 4/2015 | Abecassis .......... H04N 21/4884 386/201 |
| 2015/0106856 A1 | 4/2015 | Rankine |
| 2015/0170325 A1* | 6/2015 | Abecassis .......... H04N 21/4542 345/2.1 |
| 2015/0244730 A1* | 8/2015 | Vu ......................... G06F 21/566 726/24 |
| 2016/0286244 A1* | 9/2016 | Chang ................ H04N 21/4788 |
| 2017/0072301 A1* | 3/2017 | Abecassis .............. A63F 9/183 |
| 2017/0125060 A1 | 5/2017 | Zhang et al. |
| 2017/0149795 A1* | 5/2017 | Day, II ................. H04L 63/108 |
| 2017/0195746 A1 | 7/2017 | Gupta |
| 2018/0196879 A1 | 7/2018 | Lev et al. |
| 2018/0232592 A1 | 8/2018 | Stewart et al. |
| 2018/0310066 A1* | 10/2018 | Kobayashi ........... G11B 27/322 |
| 2018/0341980 A1* | 11/2018 | Garg .................... G06F 16/951 |
| 2018/0376205 A1* | 12/2018 | Oswal .................. G06T 19/006 |
| 2019/0114781 A1 | 4/2019 | Gao et al. |
| 2019/0179405 A1 | 6/2019 | Sun et al. |
| 2019/0191203 A1 | 6/2019 | Asbun et al. |
| 2019/0268212 A1* | 8/2019 | Na ....................... H04L 41/0266 |
| 2019/0289359 A1 | 9/2019 | Sekar et al. |
| 2019/0325084 A1* | 10/2019 | Peng ..................... G06V 20/10 |
| 2020/0077150 A1* | 3/2020 | Fox ..................... H04N 21/4318 |
| 2020/0111226 A1* | 4/2020 | Rakesh Nattoji Rajaram ............ H04N 5/445 |
| 2020/0134298 A1* | 4/2020 | Zavesky ................. A63F 13/33 |
| 2020/0169787 A1* | 5/2020 | Pearce ............... H04N 21/4532 |
| 2020/0177960 A1 | 6/2020 | Rakshit et al. |
| 2020/0204848 A1* | 6/2020 | Johnson ................. H04N 7/188 |
| 2020/0413113 A1 | 12/2020 | Tofighbakhsh et al. |
| 2021/0073264 A1* | 3/2021 | Vaughn .................. G06N 20/00 |
| 2021/0081495 A1* | 3/2021 | Hook ...................... H04N 1/448 |
| 2021/0136454 A1 | 5/2021 | Lewis et al. |
| 2021/0195286 A1* | 6/2021 | Lohumi ................. G06V 10/82 |
| 2021/0279525 A1* | 9/2021 | Goyal .................. G06V 10/776 |
| 2021/0383115 A1* | 12/2021 | Alon ................... G06Q 30/0276 |
| 2022/0058393 A1* | 2/2022 | Calvert ................... H04N 23/62 |
| 2022/0239988 A1* | 7/2022 | Yang .................. H04N 21/2187 |
| 2022/0323862 A1 | 10/2022 | Baba et al. |
| 2022/0374635 A1* | 11/2022 | Xiong ................. G08B 13/19608 |
| 2023/0052265 A1* | 2/2023 | Pratt ..................... G06V 40/23 |
| 2023/0057010 A1* | 2/2023 | Huang ................. G06V 10/764 |
| 2023/0070874 A1 | 3/2023 | Feng et al. |
| 2023/0199255 A1 | 6/2023 | Sanford et al. |
| 2023/0274483 A1* | 8/2023 | Jeon ........................ G06T 7/20 345/633 |
| 2023/0289830 A1* | 9/2023 | Osborn ...................... G06N 5/04 |
| 2023/0409749 A1* | 12/2023 | Li ....................... H04N 21/4318 |
| 2024/0037145 A1 | 2/2024 | Ziccardi et al. |
| 2024/0202449 A1 | 6/2024 | Coutinho et al. |
| 2024/0259639 A1 | 8/2024 | Kölhi et al. |
| 2024/0388744 A1 | 11/2024 | Sedouram et al. |

* cited by examiner

SYSTEMS AND METHODS FOR LEVERAGING MACHINE LEARNING TO ENABLE USER-SPECIFIC REAL-TIME INFORMATION SERVICES FOR IDENTIFIABLE OBJECTS WITHIN A VIDEO STREAM

BACKGROUND

This disclosure is directed to identifying objects in a media stream. In particular, techniques are disclosed for leveraging machine learning to enable user-specific real-time information services for objects identified in a media stream.

SUMMARY

Manually searching for information related to the people and objects visible within live and/or recorded video streams, especially discontinued commercial products, requires a significant investment in time and effort. This often results in a break in focus of the video stream and takes the user's attention away from the event/video stream being watched. It also requires quite a bit of existing knowledge from each individual end-user in order to uncover the information or services currently available regarding the real-world object itself (such as specifically which handbag or dress someone is wearing, precisely which brand and model watch/digital device a character in a movie is using, or the real-world name of a lesser-known actor appearing briefly within a scene). By being able to receive real-time, user-specific information services related to each and every identifiable object on screen, each individual experiencing a video stream (and even multiple co-located individuals watching the same video stream together) could receive information about objects in the video stream that are of interest to them. For example, each user may receive reviews and purchasing information for identified objects, professional histories of actors or persons, or even comparisons of the object with the user's existing equipment (e.g., comparison of a new smartphone with the user's current smartphone). This provides significantly enhanced value and personal satisfaction compared with traditional, non-enhanced viewing experiences. This enhanced accessibility to object-specific information products and services would also be likely to increase the marketing and product placement values of the constant stream of consumer products discernible in real-time and recorded broadcasts. This may also significantly reduce the information and knowledge barriers required for the majority of end-users to interact with those products/services they desire during a fleeting moment of interest or inspiration.

While watching today's streaming video services, it is not currently possible for end-users to seek and receive information and other services connected with or related to each identifiable object visible within the video stream (e.g., generic object types, specific object types, people) without resorting to manually performing a separate web search. This requires time and effort, a significant shift of attention, and most importantly, a non-trivial degree of prior knowledge of the object in order for the search to be successful. This disclosure addresses these shortcomings.

This disclosure proposes creating an entirely new class of highly individualized end-user-specific metadata streams by leveraging and combining information from dynamically structured chains and combinations of artificial intelligence (AI) and machine learning (ML) image classification models and/or audio classification models. Data available from local sources (e.g., on-device information stores) as well as from online digital data brokerages can be used to enable entirely new, real-time and end-user-specific information products and services for each end-user.

The techniques described in this disclosure make it possible for people to select from, and to receive, highly customized end-user-specific information and services related to computer-identifiable objects visible within live broadcasts and/or previously recorded video streams. These can be generally identifiable object classes such as cars, specifically identifiable objects such as a specific model of car, or even specifically identifiable people. Information about these identified objects can be provided to the end-user by directly interacting with these objects within the video stream, regardless of whether the stream is live or paused. In other words, without having to know anything about the real-world person/object itself (hereafter simply referred to as "object"), end-users would gain the ability to receive information and other uniquely generated content related directly to the real-world object simply by selecting the object of interest while watching the ongoing video stream and indicating which of the end-user-specific information services they wish to receive about that object.

This disclosure describes a way to enable real-time end-user-specific interaction with identifiable objects visible within streaming video content. This allows each viewer to separately act upon their momentary interests by clicking/activating objects recognized by AI models running either on server side or on client side, or within their set top box, computer, mobile, tablet, smart TV, etc. For example, if a user really likes the look of the watch an actor is wearing but lacked the knowledge necessary to find out what kind of a watch it is, what it costs or whether it is even available in their region, they would find it very difficult to move forward with this interest and a potential sale would be lost. Using an AI-assisted video platform, the user would only need to click on, or otherwise interact with, the watch in the video (while streaming or paused) and this information would be discretely displayed for them in the video player or separate app/browser window, as appropriate. As another example, if a car logo is shown in a film or video stream, customized suggestions of information relevant to that particular end-user could be requested/received by clicking or otherwise activating the recognized logo.

The frequency of displaying information about identified objects in the media stream can be controlled. For example, a phone might appear in minute 5 and minute 15. There is no need to present information about the phone every time it is detected in a scene. Accordingly, the information may be presented the first time the object is displayed, and an indication that information has already been displayed for that object may be stored. As objects are identified in the media stream, they can be compared with the stored indications to determine if information has already been displayed for any of the identified objects. Information will only be displayed objects for which no information has yet been displayed.

User interaction with displayed information may also be used to control future displays of information. For example, information may only be displayed for objects the user is interested in, even if other objects are identified in the media stream. User preferences, content consumption history, internet search history, and other user data may be used to predict which objects the user is interested in the user does not interact with displayed information for an object, the user may not be interested in the object, and the predictions are updated accordingly. Therefore, if the object is detected at a later time, no information will be displayed for that object, nor will any indication that the object has been identified.

As these types of AI/ML models can be trained for virtually any content, it is equally possible to identify generic object types (e.g., a bike) as well as specific individual objects (e.g., an Oculus Quest 2 VR headset) or even individually-recognizable people (e.g., Michael Jordan). With respect to these types of AI/ML models, any type of auditory or video content can be analyzed in order to detect identifiable sounds/objects which can then be made actionable and recognized by other systems (such as TV's, DVRs and video playback software). No pre-processing is required for adding these types of enhanced information services when viewing "classic" films either as these techniques would also work for identifying James Bond's classic Aston Martin in the old Bond movies, for example.

The disclosure builds upon several building blocks which are combined in a new way. MPEG-7 metadata streams are used for multiplexing either AI image recognition models or image classification data (bounding box coordinates, classifier, AI model owner, time stamp and more). AI models are used for image classification. This can be any image classification model, such as Tensorflow, Tensorflow Lite, ONNX, etc., though any current or future image recognition technology may be used.

Lightweight computing platforms for image classification may run on the client/consumer side or server-side computing platform for image classification. Bounding box coordinates for each object, classifiers, AI model owners, time stamps and more may be sent over the MPEG-7 metadata channel or via an out-of-band data channel to the client. This disclosure is not only limited to video contents—AI-powered object classifiers can also work on audio and other types of data (sensor data, meta data of other types).

With the techniques described in this disclosure it is also easy to roll out special deals for consumers that have seen (or heard) the product in a video, for example. This is something that could become very attractive for large vendors and product companies who are actively engaged in marketing campaigns including or centered around active product placement.

One implementation is to run the object recognition model on the client side, on the rendering platform for video playback. Updates/downloads of the AI model can be done in-band or out of band. The video stream is analyzed during rendering, and if an object is detected, the viewer is notified that an actionable object is on screen. If the viewer decides to activate or click on the object, the viewer is taken to a URL connected with the object. In some embodiments, the information associated with the object can be presented using a complimentary application (e.g., an application associated with the AI-assisted video platform. Such application can be presented over the video or the video content that the user is consuming maybe resized so that the application doesn't obscure the video stream.

The object recognition model can be run server side as well. The video stream is analyzed by the AI model and the metadata (AI model results) are sent to the client(s) viewing the video. From a viewer perspective, the function is identical. This way of implementing the object recognition may be more energy efficient for battery-powered devices (e.g., smartphones, tablets), since the AI model only has to run in one place instead of in every client. For time shifted services and other non-real time video services, pre-analyzing the video can be done, so the object recognition metadata is cached with the video. Another way to do this is by launching separate AI models for every video stream that is non-real time, but this demands mode processing power.

Multiple AI models can be chained to process the same video stream but look for different objects or link to different URLs if the vendors compete for the customers attention. In some implementations the AI models are serialized, but there are also parallelized implementations where the video stream is split into one stream per vendor for object recognition. The detected object metadata information can be sent in band or out of band or both. A metadata channel (MPEG-7 for instance) can be shared among multiple vendors. In this architecture, all metadata must be tagged with the ID of the vendor as well. An example can be that Apple and Samsung are both running AI detection models for mobile phones, and depending on what phone is detected, the metadata should be tagged with the correct vendor. AI model chaining is also possible on the client side. The metadata information is tagged with the vendor in this implementation as well, so it acts in the same way as described above. Updates and downloads of new AI models can be done in band or out of band.

In some implementations, different vendors compete for the viewers' clicks on a specific product/object. A first vendor wins the auction and that vendor's URL is mapped to an object. When the object is detected in the video stream, the viewer decides to click on it and through the mapping table the viewer is taken to the mapped URL. Since this is an active engagement from the viewer, the vendor can optionally launch specialized campaigns that are only available by actively clicking in this video. Existing cookie information from the client and other profile data (from social media, interest sites etc.) can give the vendor even more detailed information on who the customer is. The AI-assisted video platform may utilize existing information about the viewer to enhance its personalization and targeting capabilities, as long as regulations are followed and the viewer has accepted sharing this with third parties.

The techniques described in this disclosure can be used on single services for the viewers and not for other services. AI models from specific vendors can in this use case only be running for specific video services. By leveraging this, special deals can be created for subscribers of some services.

Another way to run the AI recognition models is to run the same AI-models for all videos being streamed to the viewer. Even if the viewer changes to another video stream, the same image recognition AI models are running. In some cases, not all AI models that were running for a first video will be applicable to a second video. A determination may be made as to which of the AI models are applicable and only those will continue to run. Additional AI models that are applicable to the second video may also be run.

In some embodiments, hybrid implementations are also possible. For example, a set of video channels/services may share the same AI models for object recognition, but not others. Multiple sets of services/channels can exist as well—AI model A may be running for services 1, 2, and 3 while AI models B, C, and D are running for services 4, 5, and 6. Overlaps of sets can also be created, where some AI models run across multiple channel sets.

Systems and methods are described herein for enabling user-specific real-time information services for identifiable objects in a media stream. A media stream is accessed, and one or more classification models are selected for the media stream. Using the selected classification models, at least one object in the media stream is identified. As used herein, an object may be any depicted item, character, actor, or entity, as well as a sound object. An input associated with an identified object is received and, in response, information related to the object is generated for presentation.

The one or more classification models may be received from a server via a separate transmission from that of the media stream. The user device may retrieve the classification models from a server based on a reference contained in a manifest file of the media stream. For example, the media stream may be received using MPEG-DASH or other streaming format that utilizes manifest files. The manifest file may include one or more URLs or other pointers for relevant classification models for the media asset.

In some embodiments, a notification indicating that an object has been identified is generated for output. The notification may be a visual notification, and audio notification, or both. The notification may be output on the same device on which the media asset is being output or on a second device. For example, the media asset may be output on a smart TV and the notification may be output on a smartphone.

To generate for presentation information related to an object, a type of information desired by the user may first be determined. For example, the user may be interested in background information on an object, biographical information on an actor, purchasing information for a product, or any other type of information. User preferences, search history, internet usage history, and the like may be used to determine the type of information desired by the user for different types of objects. The desired type of information is then retrieved. A preferred method of presentation may also be determined. For example, user profile data may indicate that the user prefers to receive the information through a popup alongside the depiction of the object (i.e., overlaid on the media stream), as an email or SMS message, or as a notification on a second device. The information is then generated for presentation in the appropriate format and transmitted to the appropriate device.

In some embodiments, both the media stream and metadata for each identified object in the media stream are transmitted to a user device. The metadata may be transmitted separately from each of the one or more selected classification models. The media stream may be concurrently fed into each of the classification models. In some cases, such as when additional latency may be tolerated, the media stream may be fed into different classification models at different times. If more than one classification model is run on the same server, feeding the media stream to different models serially may reduce processing loads on the server.

Classification models may be provided by different vendors. Each respective vendor may configure their classification model to identify objects with which the respective vendor is associated. For example, Apple may configure a classification model to identify smartphones and tablets and provide purchasing information for iPhones™ and iPads™. Bids may be received from each vendor for an identified object. The classification model provided by the vendor having the winning bid may then be used to identify the object. Information related to the object is then retrieved from the winning vendor.

In some implementations, an AI-assisted video platform or a software service associated therewith may prompt the bid for ad space. For example, the platform may advertise that a 37-year-old male is an electronics fan based on that user's previous interactions with the supplemental metadata displayed during consumption of media streams.

Also described herein are systems and methods for enabling user-specific real-time information services for identifiable objects in different media streams. A first content type of a first media stream being output is determined, and at least one first classification model is selected based on the first content type. Objects are identified in the first media stream using the at least one first classification model and information related to the objects is generated for presentation. A change in output of media streams from the first media stream to a second media stream may then be detected. For example, a channel change command may be received from a user input device. As another example, an identifier of the first media stream may be periodically compared with an identifier of a media stream currently being output. A second content type of the second media stream is then determined and at least one second classification model is selected based on the second content type. Objects are then identified in the second media stream using the at least one second classification model and information related to the objects in generated for presentation.

The first content type may be compared with the second content type. Based on this comparison it may be determined whether the first content type and the second content type have a common feature. If so, use of a classification model corresponding to the common feature continues while use of other classification models selected for the first content type is discontinued in favor of other classification models.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
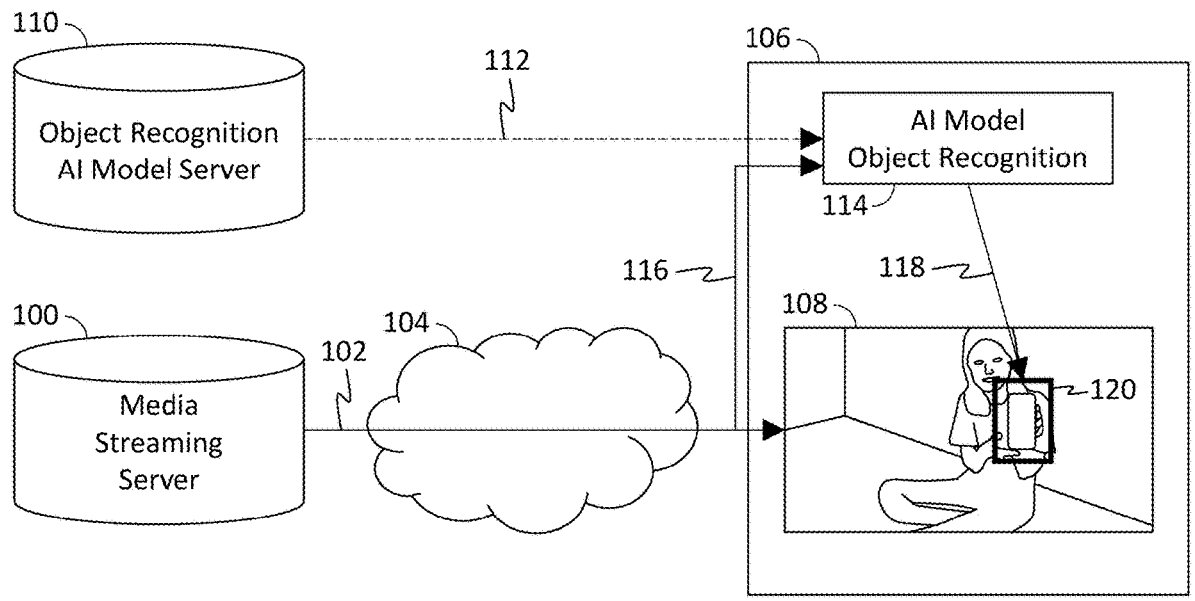
FIG. 1 shows media and object recognition models delivered to a user device at which objects within the media are identified, in accordance with some embodiments of the disclosure.

FIG. 1 shows media and object recognition models delivered to a user device at which objects within the media are identified, in accordance with some embodiments of the disclosure. Media streaming server 100 transmits 102 a media stream, via network 104, to user device 106. User device 106 may be any device capable of receiving and outputting, or driving output of, the media stream for consumption by a user. For example, user device 106 may be a smart TV that outputs 108 the media stream. User device 106 may also use AI/ML classification models to identify objects in the media stream. Object recognition AI model server 110 may transmit 112 one or more classification models to user device 106. User device 106 may include an AI model object recognition module 114. The media stream is fed 116 into AI model object recognition module 114. When AI model object recognition module 114 recognizes an object, it may cause 118 an indication 120 of the recognition to be displayed. For example, AI model object recognition module 114 may transmit an instruction to a video output module to display indication 120 at the location within one or more frames of video at which the object is depicted. In the example of FIG. 1, the indication is a box or highlight surrounding the recognized object. However, other types of indications may be used, including notifications on user device 106 or another user device, audio tones, banner overlays, etc.

Figure 2:
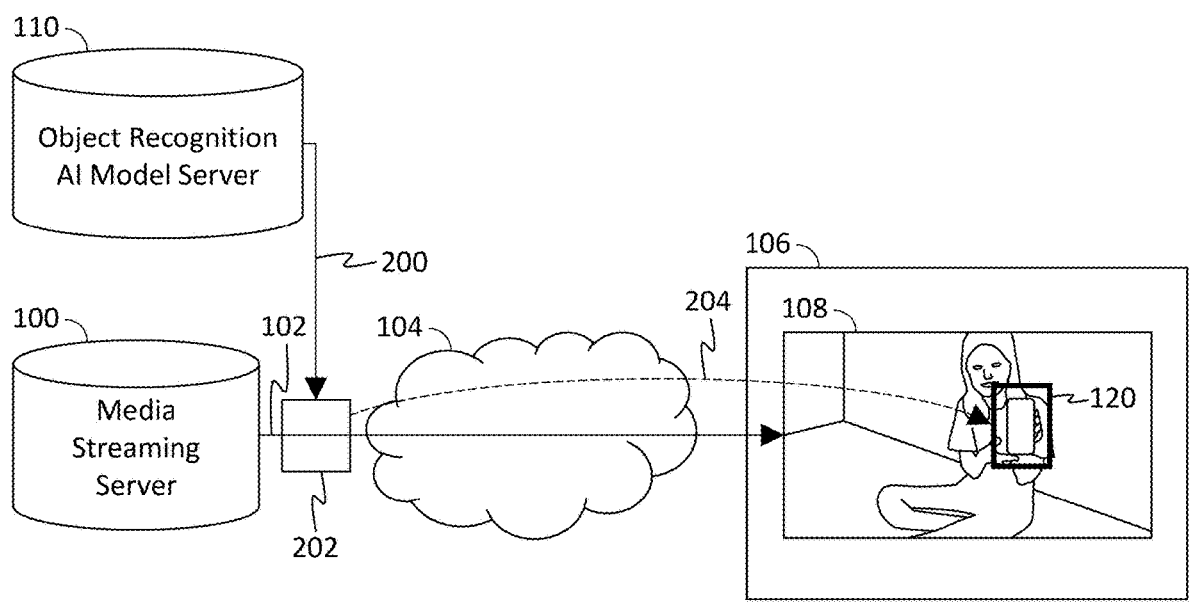
FIG. 2 shows media and metadata describing identified objects within the media delivered to a user device, in accordance with some embodiments of the disclosure.

FIG. 2 shows media and metadata describing identified objects within the media delivered to a user device, in accordance with some embodiments of the disclosure. Similar to the embodiment described above in connection with FIG. 1, media streaming server 100 transmits 102 a media stream, via network 104, to user device 106 which outputs 108 the media stream. In this embodiment, however, the AI model object recognition module is not located at user device 106. Instead, object recognition AI model server 110 transmits 200, via network 104 or via another network or data connection (e.g., a LAN, a mobile broadband network, etc.), one or more classification models to a server-side AI model object recognition module 202. Metadata and/or notifications of identified objects are then transmitted 204 to user device 106, causing indication 120 to be displayed.

Figure 3:
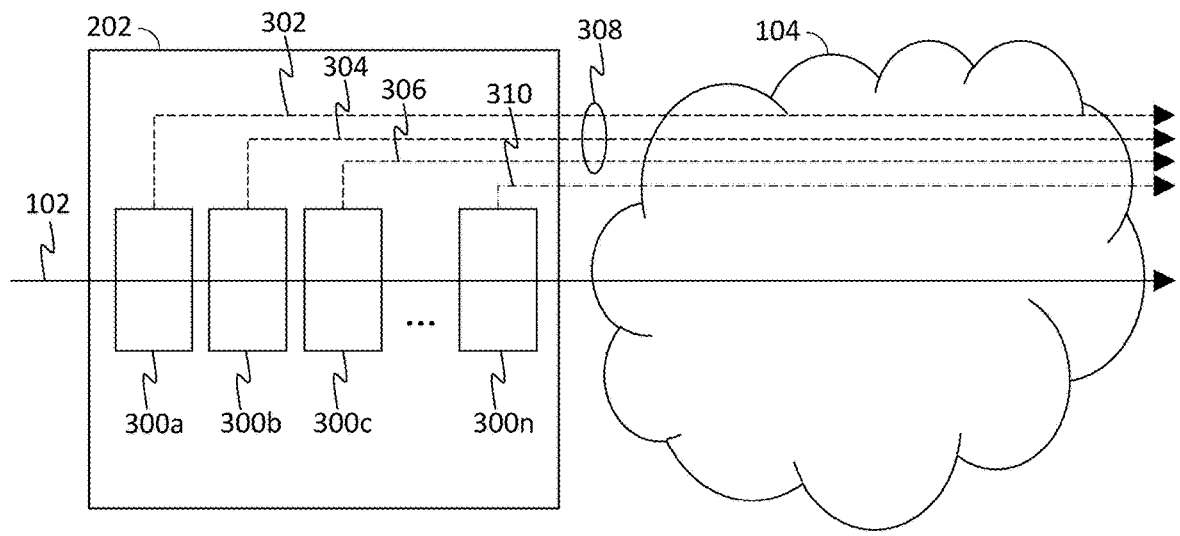
FIG. 3 shows media and metadata from multiple object recognition models describing identified objects within the media delivered to a user device, in accordance with some embodiments of the disclosure.

FIG. 3 shows media and metadata from multiple object recognition models describing identified objects within the media delivered to a user device, in accordance with some embodiments of the disclosure. Similar to the embodiment of FIG. 2, media stream 102 is processed by server-side AI model object recognition module 202. Multiple AI classification models 300*a*-300*n* may be used, concurrently or serially, to identify objects in the media stream. Metadata from each classification model is then transmitted to the user device 106 via network 104. Metadata from several classification models may be transmitted together over a single communication channel. For example, metadata transmissions 302, 304, and 306 from classification models 300*a*, 300*b*, and 300*c*, respectively, may all be transmitted together over channel 308, while metadata transmission 310 from classification model 300*n* may be transmitted separately.

Figure 4:
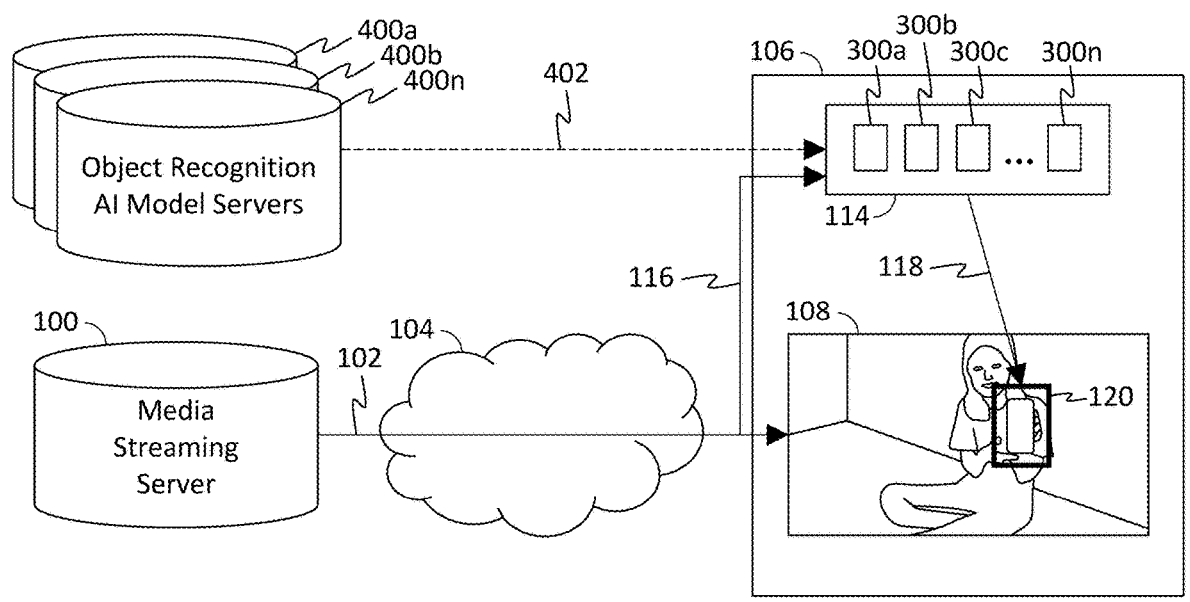
FIG. 4 shows media and multiple object recognition models delivered to a user device at which objects within the media are identified, in accordance with some embodiments of the disclosure.

FIG. 4 shows media and multiple object recognition models delivered to a user device at which objects within the media are identified, in accordance with some embodiments of the disclosure. In this embodiment, media streaming server 100 transmits 102 a media stream via network 104 to user device 106. User device 106 displays 108 the media stream. User device 106 includes AI model object recognition module 114. Multiple classification models from object recognition AI model servers 400*a*-400*n* are transmitted 402 to user device 106. The classification models 300*a*-300*n* are used by AI model object recognition module 114 to identify objects in the media stream, which is also fed 116 to AI model object recognition module 114. When AI model object recognition module 114 recognizes an object, it may cause 118 an indication 120 of the recognition to be displayed.

Figure 5:
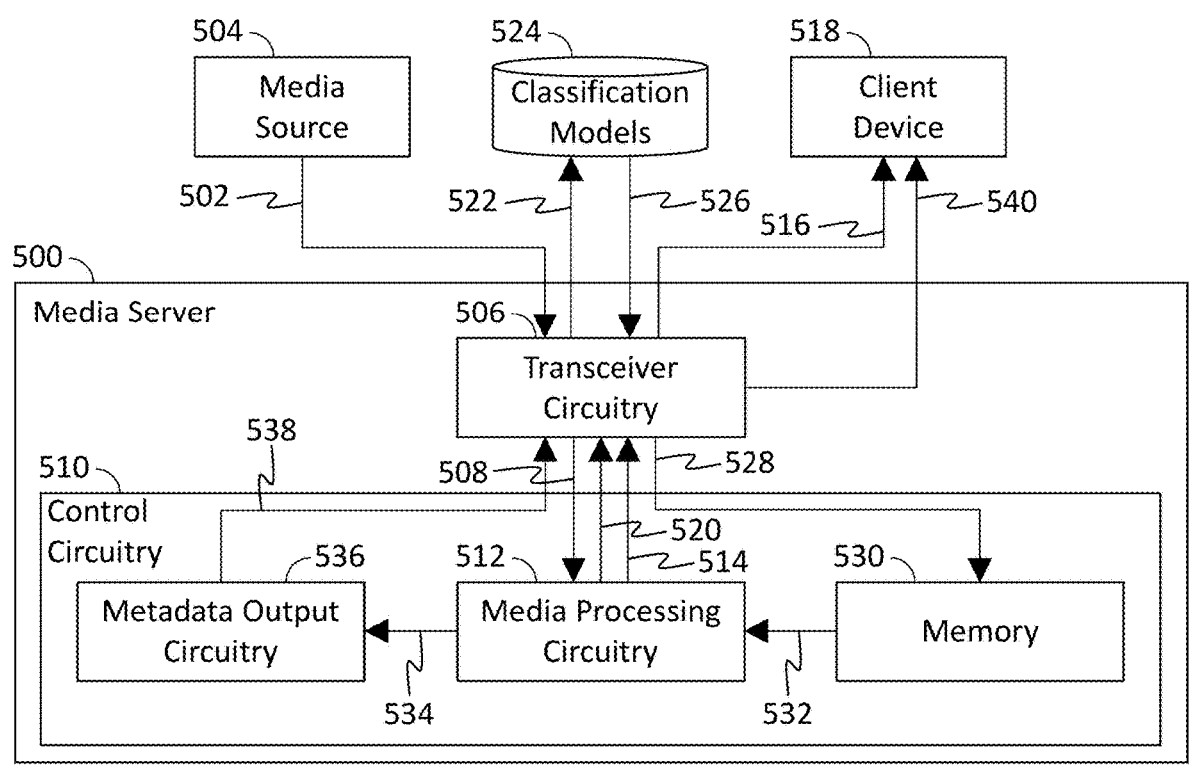
FIG. 5 is a block diagram showing components and dataflow therebetween of a media server at which objects within the media are identified, in accordance with some embodiments of the disclosure.

FIG. 5 is a block diagram showing components and dataflow therebetween of a media server at which objects within the media are identified, in accordance with some embodiments of the disclosure. Media server 500 receives 502 media data from media source 504. Media source 504 may be a media storage device, a live media ingest server, a broadcast media receiver, a multicast media receiver, a unicast media receiver, or any other suitable device for providing media data for streaming to client devices. Media server 500 receives the media data using transceiver circuitry 506. Transceiver circuitry 506 may comprise a network connection over which data can be transmitted to and received from remote devices, such as an Ethernet connection, Wi-Fi connection, mobile broadband interface, or connection employing any other suitable network protocol. Transceiver circuitry 506 may also include a cable television tuner or other connection suitable for receiving broadcast media and VOD content from a cable headend.

Transceiver circuitry 506 transmits 508 the media stream to control circuitry 510, where it is received using media processing circuitry 512. Control circuitry 510 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, filed-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media processing circuitry 512 processes the media stream for output to a user device. For example, media processing circuitry 512 may decode audio and/or video data from the media stream and reencode it into a format suitable for streaming. Media processing circuitry 512 then transmits 514 the media stream to transceiver circuitry 506, which in turn transmits 516 the media stream to client device 518 where it is output for consumption by a user.

Media processing circuitry 512 identifies a type of the media content and transmits 520 a request for appropriate classification models to transceiver circuitry 506. Transceiver circuitry 506 transmits 522 the request to classification models database 524. Classification models database 524 may be located in a memory of media server 500, or may be located in one or more remote servers. Classification models database 524 transmits 526 the requested classification models to media server 500. Transceiver circuitry 506 receives the classification models and transmits 528 the classification models to memory 530. Memory 530 may be any suitable electronic storage device such as random-access memory, read-only memory, hard drives, optical drives, solid state devices, quantum storage devices, or any other suitable fixed or removable storage devices, and/or any combination of the same. The classification models may be stored in memory 530 for later use or may be stored temporarily while the media stream is being transmitted to client device 518.

Memory 530 transmits 532 the classification models to media processing circuitry 512. Media processing circuitry 512 uses the classification models to identify objects within the media stream. As used herein, objects may include people, characters, inanimate objects, sounds, music, or any other discrete entity within the media stream. Metadata describing each identified object is then transmitted 534 to metadata output circuitry 536. The metadata describing an identified object may include an identifier of the object, a playback position within the media stream at which the object appears, coordinates at which the object is depicted in one or more video frames of the media stream, a URL or other pointer to additional information related to the object, etc. Metadata output circuitry 536 formats the metadata for transmission to client devices. For example, metadata output circuitry 536 may encode the metadata for transmission in an out-of-band channel on a cable TV distribution network, as a data packet for transmission over an IP network, as a data stream multiplexed with the media stream, as part of an MPEG-7 metadata stream, or any other suitable format. Metadata output circuitry 536 then transmits 538 the metadata to transceiver circuitry 506, which in turn transmits 540 the metadata to client device 518.

Figure 6:
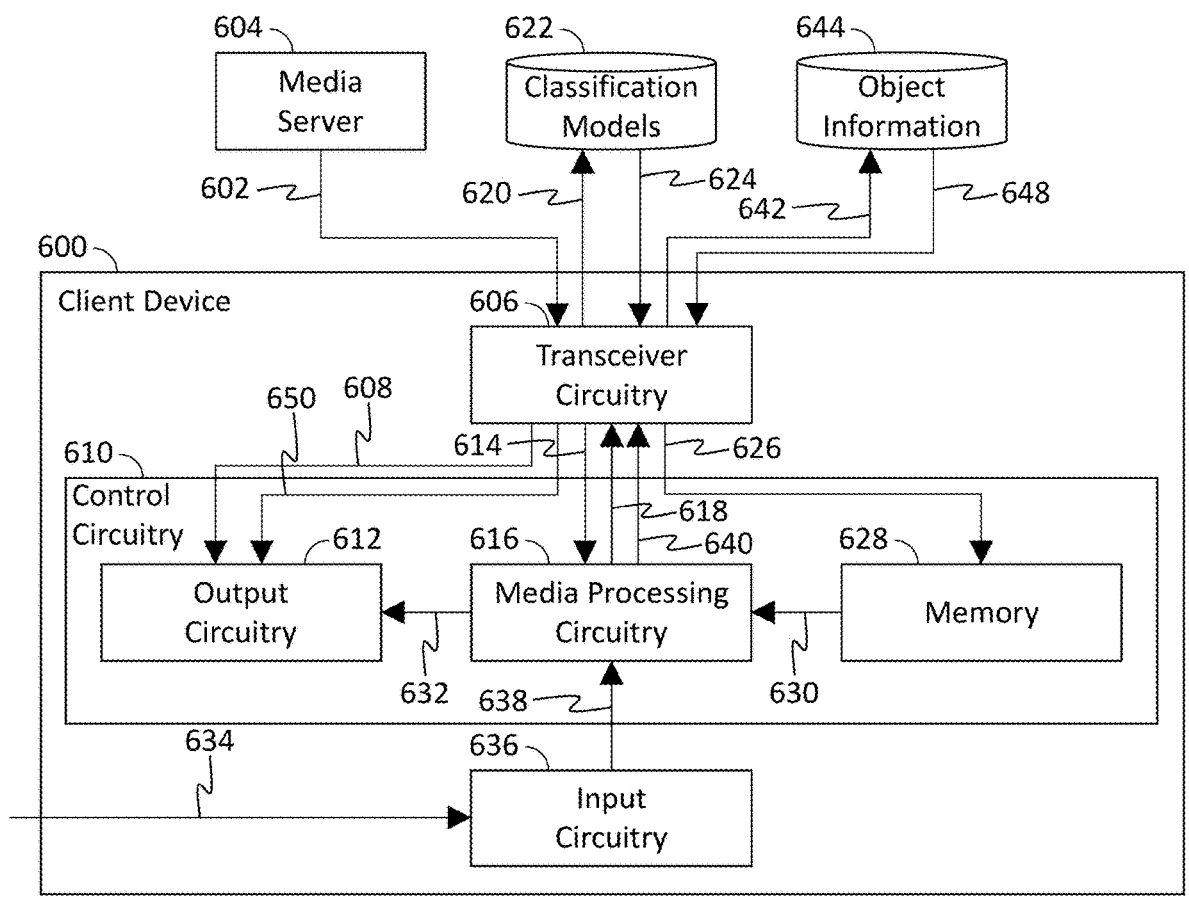
FIG. 6 is a block diagram showing components and dataflow therebetween of a user device at which objects within the media are identified, in accordance with some embodiments of the disclosure.

FIG. 6 is a block diagram showing components and dataflow therebetween of a user device at which objects within the media are identified, in accordance with some embodiments of the disclosure. Client device 600 receives 602 a media stream from media server 604. Media server 604 may be an instance of media server 500. Client device 600 receives the media stream using transceiver circuitry 606. Transceiver circuitry 506 may comprise a network connection over which data can be transmitted to and received from remote devices, such as an Ethernet connection, Wi-Fi connection, mobile broadband interface, or connection employing any other suitable network protocol. Transceiver circuitry 506 may also include a cable television tuner or other connection suitable for receiving broadcast media and VOD content from a cable headend.

Transceiver circuitry 606 transmits 608 the received media stream to control circuitry 610, where it is received using output circuitry 612. Control circuitry 610 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, filed-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Output circuitry 612 processes the media stream for output for user consumption. For example, output circuitry 612 may decode audio and/or video data from the media stream and use the decoded data to drive video and/or audio output devices accordingly.

Transceiver circuitry 606 also transmits 614 the media stream to media processing circuitry 616. Media processing circuitry 616 identifies a type of the media content and transmits 618 a request for appropriate classification models to transceiver circuitry 606. Transceiver circuitry 606 transmits 620 the request to classification models database 622. Classification models database 622 may be located in a memory of media server 600, or may be located in one or more other remote servers. Classification models database 622 transmits 624 the requested classification models to client device 600. Transceiver circuitry 606 receives the classification models and transmits 626 the classification models to memory 628. Memory 628 may be any suitable electronic storage device such as random-access memory, read-only memory, hard drives, optical drives, solid state devices, quantum storage devices, or any other suitable fixed or removable storage devices, and/or any combination of the same. The classification models may be stored in memory 628 for later use or may be stored temporarily while the media stream is being received.

Memory 628 transmits 630 the classification models to media processing circuitry 616. Media processing circuitry 616 uses the classification models to identify objects within the media stream. Metadata describing each identified object is then transmitted 632 to output circuitry 612. The metadata describing an identified object may include an identifier of the object, a playback position within the media stream at which the object appears, coordinates at which the object is depicted in one or more video frames of the media stream, a URL or other pointer to additional information related to the object, etc. Output circuitry 612 generates for display an indication of the identified object. For example, output circuitry 612 may generate for display a popup alongside the depiction of the object (i.e., overlaid on the media stream). Alternatively or additionally, output circuitry 612 may generate a message (e.g., an email or SMS message) or other type of notification to be transmitted to a second device.

Client device 600 may receive 634 an input associated with an identified object from a user of client device 600 using input circuitry 636. Input circuitry 636 may be a touchscreen, control panel, keyboard, other user interface device connected to, or integrated with, client device 600. In some embodiments, input circuitry 636 may be a wireless receiver that communicates with an external user interface device, such as a remote control or Bluetooth keyboard. Input circuitry 636 may, in some embodiments, be incorporated into transceiver circuitry 606. Input circuitry 636 transmits 638 the user input to media processing circuitry 616. Based on the metadata related to the object with which the input is associated, media processing circuitry 616 generates a request for information about the object. The request may be based on a type of information desired by the user. For example, user profile data may indicate that the user is interested in purchasing a new smartphone. If the object is a smartphone, the user may desire purchasing information. User profile data may also indicate that the user has a general interest in cars. If the object with which the input is associated is a car, the user may desire general information about the specific car. Media processing circuitry 616 generates the appropriate request and transmits 640 the request to transceiver circuitry 606. Transceiver circuitry 606 transmits 642 the request to object information database 644. The requested information is then received 648 from object information database 644 using transceiver circuitry 606. Transceiver circuitry 606 transmits 650 the information to output circuitry 612 for output to the user.

Figure 7:
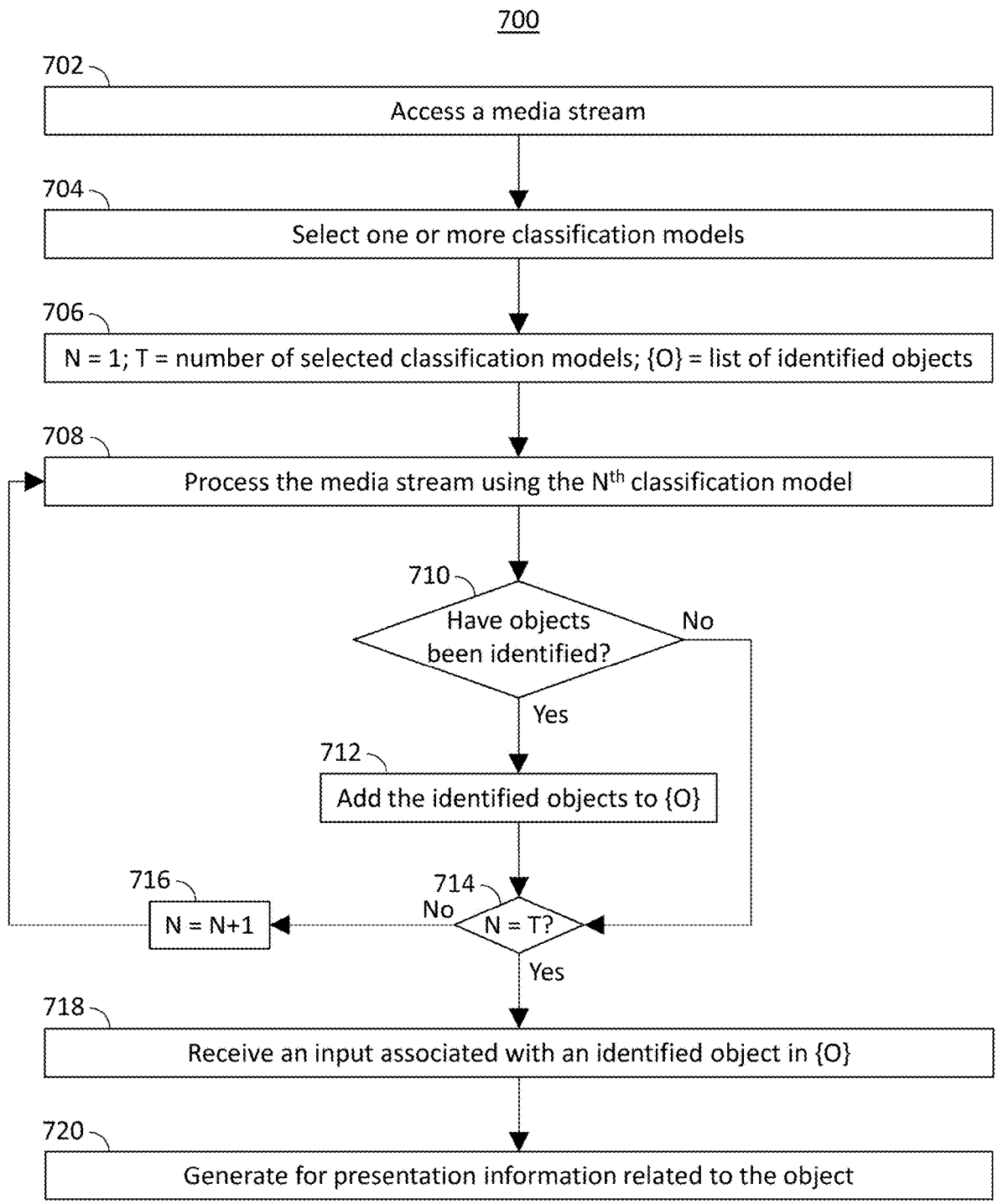
FIG. 7 is a flowchart representing an illustrative process for enabling user-specific real-time information services for identifiable objects in a media stream, in accordance with some embodiments of the disclosure.

FIG. 7 is a flowchart representing an illustrative process 700 for enabling user-specific real-time information services for identifiable objects in a media stream, in accordance with some embodiments of the disclosure. Process 700 may be implemented on control circuitry 510 or control circuitry 610. In addition, one or more actions of process 700 may be incorporated into or combined with one or more actions of any other process or embodiment described herein.

At 702, the control circuitry accesses a media stream. When executed at a media server, control circuitry 510 of media server 500 may access a media source (e.g., media source 504) from which media assets are available. Control circuitry 510 may receive a request for specific media asset from a user device (e.g., client device 600) and access a media source from which the requested media asset is available. When executed at a client device, control circuitry 610 of client device 600 transmits a request for a media asset to a media server or configures a tuner to receive a media stream from a specific over-the-air broadcast channel or cable TV channel.

At 704, the control circuitry selects one or more classification models. Classification models may be chosen based on the type of content with which the media stream is associated. For example, a classification model optimized for identification of fictional spacecraft may be selected for a science fiction media asset, while a classification model optimized for identification of football players may be chosen for a live stream of a football game. Classification models may also be chosen based on user preferences. For example, a user may have an interest in cars. Accordingly, a classification model optimized for identification of cars may be selected.

At 706, the control circuitry initializes a counter variable N, setting its value to one, a variable T representing the number of classification models, and an array or other data structure {O} into which identified objects may be placed. At 708, the control circuitry processes the media stream using the $N^{th}$ classification model. This may be accomplished using any known media processing techniques, including audio matching, image recognition, character recognition, speech recognition, or any other suitable processing technique.

At 710, the control circuitry determines whether any objects have been identified in the media stream. If so ("Yes" at 710), then, at 712, the control circuitry adds the identified object or objects to {O}. If no objects have been identified ("No" at 710), or after adding identified objects to {O}, the control circuitry determines whether N is equal to T, meaning that the media stream has been processed using all the selected classification models. If not ("No" at 714), then, at 716, the control circuitry increments the value of N by one and processing returns to 708.

If N is equal to T ("Yes" at 714), then processing moves to 718, at which an input associated with an identified object in {O} is received. When executed by a media server, control circuitry 510 of media server 500 may receive an indication of an input, such as a request for information related to an object, from a client device. When executed by a client device, control circuitry 610 of client device 600 may receive an input from a user input device or user input interface. For example, the user may tap a position on a touchscreen display at which an identified object is depicted.

At 720, the control circuitry generates for presentation information related to the object. When executed by a media server, control circuitry 510 of media server 500 may generate or add data to a metadata stream for transmission to the client device. In some embodiments, control circuitry 510 may generate a push notification to a user device associated with the requesting user. The push notification may include the information related to the object. When executed by a client device, control circuitry 610 of client device 600 may generate the information for display to the user, either from a local database or from information received from a media server (e.g., media server 500). Control circuitry 610 may also generate a local notification or a push notification for transmission to a user device associated with the requesting user.

The output of the information related to the object may, in some cases, be configured differently for or by different classification models. For example, a first classification model may provide simple information such as an identification of a specific make or model of a class of objects (e.g., smartphones or cars). Such basic information may be all that the user is interested in and therefore does not require anything more than a simple notification. Thus, for such a classification model, the output of the information may be configured to use push notifications or minimalist overlays on the media to identify the objects. Interaction with such notifications may also be configured to simply remove display of the information. Other classification models may provide other types of information, such as purchasing links, biographical data, historical data, or other large sets of data that cannot be simply and easily conveyed to the user through a notification and therefore require more significant user interaction. These types of classification models may present the user with a prompt as to how they would like the information delivered (e.g., SMS, email) or provide a URL which the user can select to view the information.

Some classification models may be provided by vendors. For example, Apple may provide a classification model for identifying electronic devices of the types sold by the company. This type of classification model may be able to recognize and identify many device models, both current and historical. The classification model may therefore be configured to provide an identification of the specific device, as well as purchasing information for a device of a similar type currently sold by Apple, or a link to a third-party website where older devices no longer being sold by Apple are available (e.g., eBay). For example, the classification model may identify an iPhone 6 within the media stream. The information presented to the user may identify the object as an iPhone 6 and provide a link to purchase the current model of iPhone (e.g., iPhone 14).

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
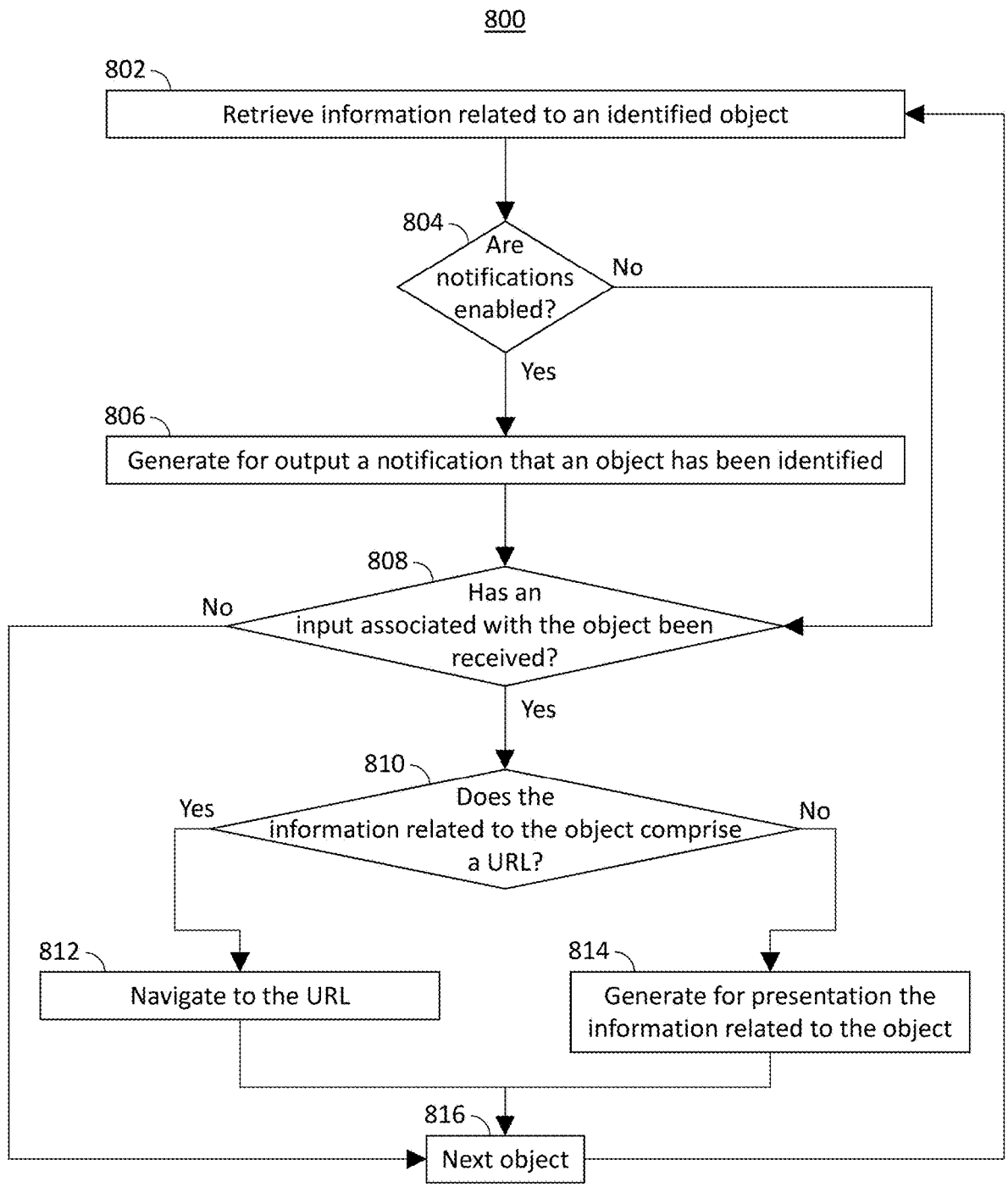
FIG. 8 is a flowchart representing an illustrative process for generating for presentation information related to an identified object, in accordance with some embodiments of the disclosure.

FIG. 8 is a flowchart representing an illustrative process 800 for generating for presentation information related to an identified object, in accordance with some embodiments of the disclosure. Process 800 may be implemented on control circuitry 510 or control circuitry 610. In addition, one or more actions of process 800 may be incorporated into or combined with one or more actions of any other process or embodiment described herein.

At 802, the control circuitry retrieves information related to an identified object. For example, the classification model may identify and object and provide a unique identifier of the object. The control circuitry may then use that identifier to retrieve information from a database outside of the classification model. As another example, the classification model may provide a URL or other pointer to the information. The control circuitry may access the URL or pointer and retrieve information stored at that location.

At 804, the control circuitry determines whether notifications are enabled. The user may configure the output or display of information related to identified objects in a variety of ways, including overlays, second screen devices, notifications, emails, SMS messages, or any combination thereof. The control circuitry may access user profile data to determine whether the user's configuration includes the output of notifications on either the client device or another user device. If notifications are enables ("Yes" at 804), then, at 806, the control circuitry generates for output a notification that an object has been identified. If executed on a media server, control circuitry 510 of media server 500 may generate for transmission to the client device or to another user device a push notification indicating identification of the object. If executed on a client device, control circuitry 610 of client device 600 may access a local notification API or other system interface to generate a local notification or may generate a push notification to be transmitted to another user device, either directly or through a server (either media server 600 or any other server that communicates with the target user device).

After generating for output the notification, or if notifications are not enabled ("No" at 804), at 808, the control circuitry determines whether an input associated with the identified object has been received. If executed on a client device, control circuitry 610 of client device 600 may detect an input from a connected or integrated user input device or interface. For example, control circuitry 610 may detect a tap or other gesture on a touchscreen display, a mouse click, a remote control input, or any other user input. In some embodiments, control circuitry 610 may detect a selection of, or interaction with, a notification displayed on a second user device. Control circuitry 610 may determine whether the input corresponds with any identified object or displayed information. For example, control circuitry 610 may compare coordinates associated with a tap or click input to determine if the position with which the user interacted is a position at which an identified object, or information related to an identified object, is displayed. If executed on a media server, control circuitry 510 of media server 500 may receive indications of user inputs from the client device.

If an input associated with the object has been received ("Yes" at 808), then, at 810, the control circuitry determines whether the information related to the object comprises a URL. For example, the control circuitry may perform a search of the information related to the object for a regular expression matching one or more patterns associated with URLs. For example, the following regular expression may be used to detect an Internet URL:

(www\.)?[a-zA-z0-9]{2,256}\.[a-z]{2,4}

Other regular expressions may be used to detect deep-links or other link or pointer formats.

If the information related to the object comprises a URL ("Yes" at 810), then, at 812, the control circuitry navigates to the URL. If executed by a media server, control circuitry 510 accesses the URL, retrieves the information from the URL or retrieves a copy of the webpage or other resource located there, and provides the information or copy of the resource to the client device. If executed by a client device, control circuitry 610 of client device 600 may generate for display a browser window and navigate within the browser window to the URL. In some embodiments, the browser window may be generated for display on a second user device.

If the information related to the object does not comprise a URL ("No" at 810), then, at 814, the control circuitry generates for presentation the information related to the object. For example, the information may be presented in the form of an email, SMS message, MMS message, notification, popup, overlay, or any other suitable method for displaying information. If executed at a media server, control circuitry 510 of media server 500 may generate the information for display and transmit the information to the client device or to a second user device. If executed at a client device, control circuitry 610 of client device 600 may generate the information for display locally or may transmit the information for display to a second user device, either directly or through a server.

After displaying the information, or if no input associated with the object has been received ("No" at 808), at 816, the control circuitry moves to the next identified object, and processing returns to 802. The above actions are then repeated for the next identified object.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
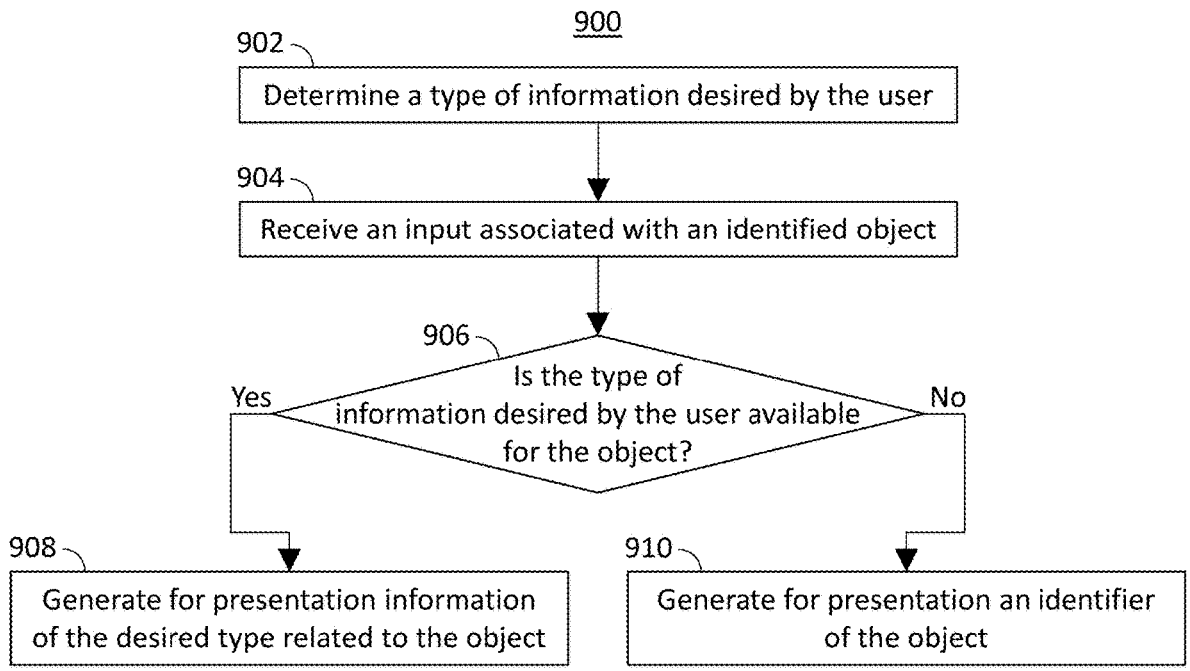
FIG. 9 is a flowchart representing an illustrative process for generating for presentation information of a desired type, in accordance with some embodiments of the disclosure.

FIG. 9 is a flowchart representing an illustrative process 900 for generating for presentation information of a desired type, in accordance with some embodiments of the disclosure. Process 900 may be implemented on control circuitry 510 or control circuitry 610. In addition, one or more actions of process 900 may be incorporated into or combined with one or more actions of any other process or embodiment described herein.

At 902, the control circuitry determines a type of information desired by the user. For example, the control circuitry may access a user profile or user preferences database. The control circuitry may determine from these data what the user's interests are and what types of information the user consumes or has recently searched for. For example, the control circuitry may determine from the user preference data that the user likes classic cars. Accordingly, historical information and/or technical specification may be desired by the user for any classic cars identified in the media stream. If the user preference data indicates that the user collects classic cars, then information on where to purchase an identified car may be desired. Different types of information may be desired for different classes of objects. For example, the user may desire purchasing information for classic cars and historical information for airplanes.

At 904, the control circuitry receives an input associated with an identified object. This may be accomplished using methods described above in connection with FIG. 8. At 906, the control circuitry determines whether the type of information desired by the user is available for the object. For example, the user may desire purchasing information for classic cars. An Aston Martin DB5 may be featured in a James Bond movie, but none may be available for purchase. If the type of information desired by the user is available ("Yes" at 906), then, at 908, the control circuitry generates for presentation information of the desired type related to the object. This may be accomplished using methods described above in connection with FIG. 8. If information of the desired type is not available ("No" at 906), then, at 910, the control circuitry generates for presentation an identifier of the object. This may inform the user of what the object is and allow them to follow up on the object at a later time. For example, the user may be able to bookmark the object or request that notifications be provided in the future if the desired type of information becomes available.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
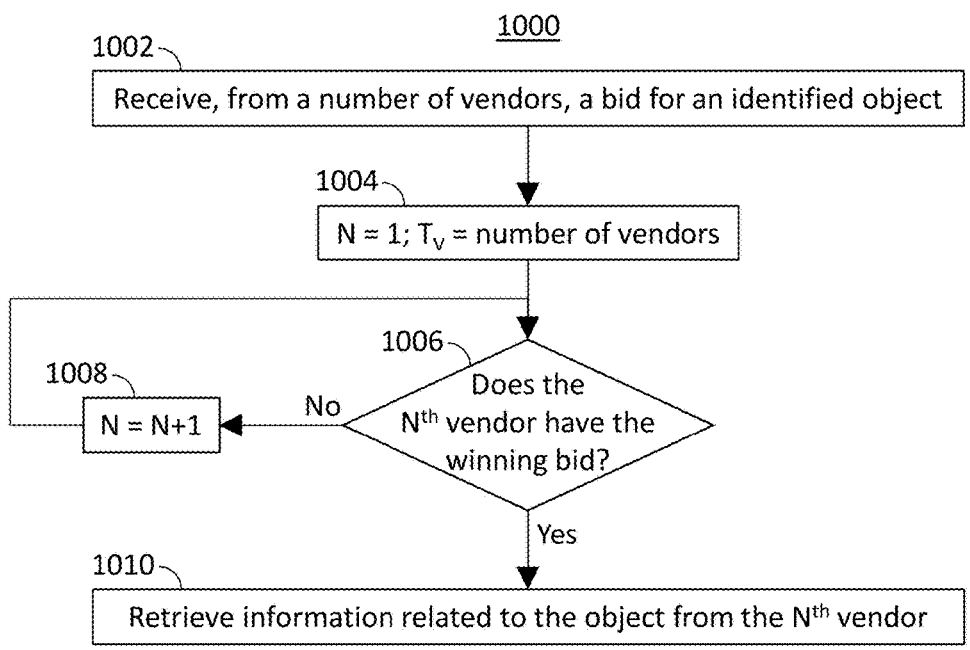
FIG. 10 is a flowchart representing an illustrative process for retrieving information related to an object from a particular vendor, in accordance with some embodiments of the disclosure.

FIG. 10 is a flowchart representing an illustrative process 1000 for retrieving information related to an object from a particular vendor, in accordance with some embodiments of the disclosure. Process 1000 may be implemented on control circuitry 510 or control circuitry 610. In addition, one or more actions of process 1000 may be incorporated into or combined with one or more actions of any other process or embodiment described herein.

At 1002, the control circuitry receives, from a number of vendors, a bid for an identified object. For example, different smartphone manufacturers may provide classification models optimized for recognition of smartphones and providing information and purchasing options for their own products. Each vendor may submit a bid for use of their classification model as part of, for example, an ad campaign. At 1004, the control circuitry initializes a counter variable N, setting its value to one, and a variable $T_v$ representing the number of vendors from which bids were received. At 1006, the control circuitry determines whether the $N^{th}$ vendor has the winning bid. For example, the control circuitry may compare the bid of the $N^{th}$ vendor to all other bids to determine if the $N^{th}$ vendor submitted the highest bid. If the $N^{th}$ vendor does not have the winning bid ("No" at 1006), then, at 1008, the control circuitry increments the value of N by one and processing returns to 1006. If the $N^{th}$ vendor does have the winning bid ("Yes" at 1006), then, at 1010, the control circuitry retrieves information related to the object from the $N^{th}$ vendor. For example, the classification model provided by the $N^{th}$ vendor may be used to identify the object and provide information related to each object.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
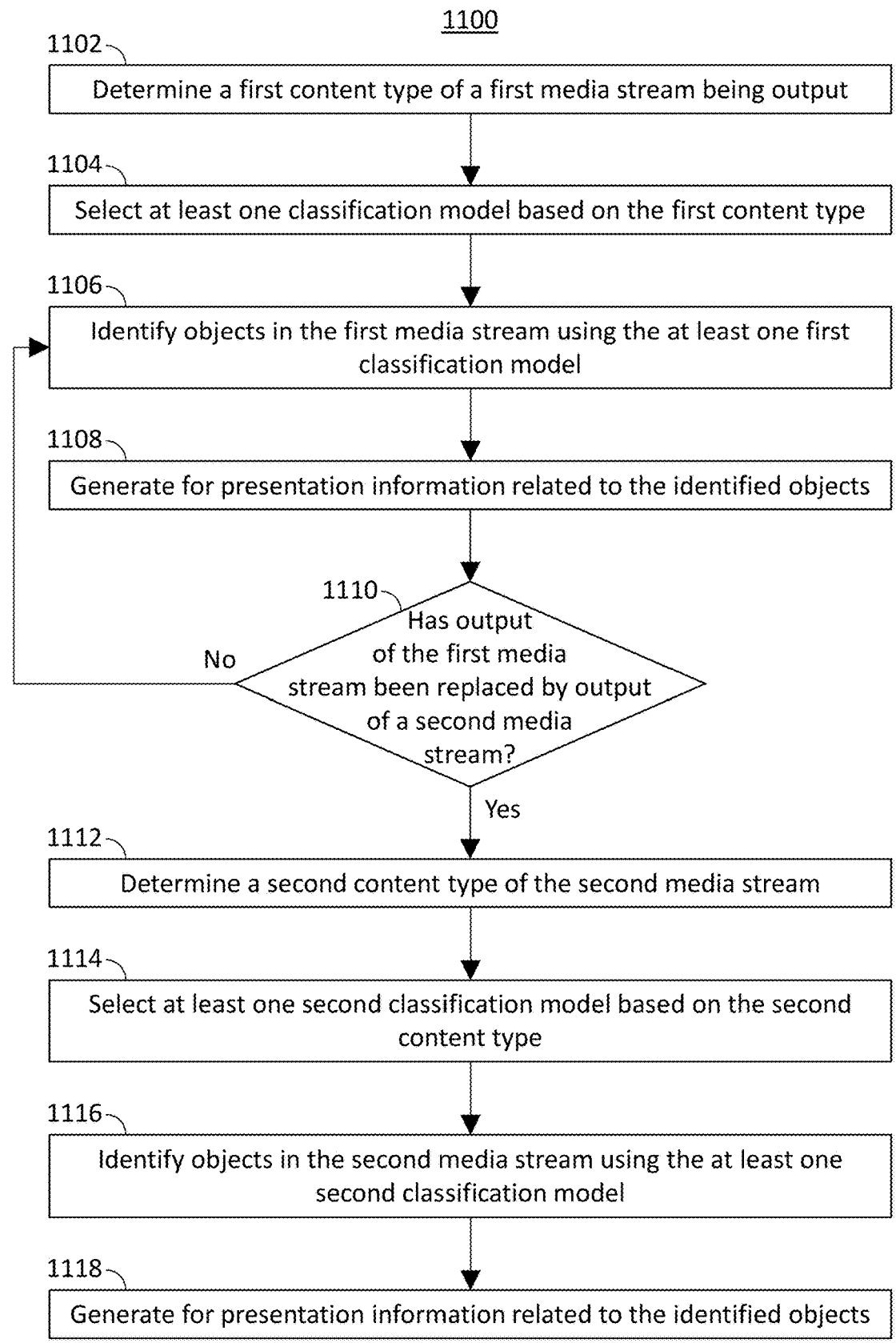
FIG. 11 is a flowchart representing a process for enabling user-specific real-time information services for identifiable objects in different media streams, in accordance with some embodiments of the disclosure.

FIG. 11 is a flowchart representing a process 1100 for enabling user-specific real-time information services for identifiable objects in different media streams, in accordance with some embodiments of the disclosure. Process 1100 may be implemented on control circuitry 510 or control circuitry 610. In addition, one or more actions of process 1100 may be incorporated into or combined with one or more actions of any other process or embodiment described herein.

At 1102, the control circuitry determines a first content type of a first media stream being output. For example, the control circuitry determines whether the first media stream comprises a live sports event, a movie, an episode of a television series, a genre of the media stream, or any other categorization of the first media stream. The control circuitry may use electronic program guide (EPG) data to identify the media stream or may use metadata contained within the media stream or referenced in a manifest file associated with the media stream.

At 1104, the control circuitry selects at least one classification model based on the first content type. For example, if the first content type is live-action science fiction movie, the control circuitry may select classifications models optimized for recognition of fictional spacecraft, real spacecraft, fictional planets, real plants, and actors. In some implementations, the content type may be determined based on the content source. For example, content from SyFy may be identified as science fiction content while content from CNN may be identified as news content. User preference data may indicate that the user likes to verify that the scientific principle represented in science fiction movies are accurate and identify discrepancies between scientific principles and their representations in fiction. Based on this, the control circuitry may also select a classification model optimized for scientific principles, which may be based on visual portrayal and/or spoken dialogue within the media stream.

At 1106, the control circuitry identifies objects in the first media stream using the at least one first classification model. This may be accomplished using methods described above in connection with FIG. 7. At 1108, the control circuitry generates for presentation information related to the identified objects. This may be accomplished using methods described above in connection with FIGS. 8 and 9.

At 1110, the control circuitry determines whether output of the first media stream has been replaced by output of a second media stream. If executed at a media server, control circuitry 510 of media server 500 may receive a request from a client device to which it is transmitting the first media stream for a second media stream. If executed at a client device, control circuitry 610 of client device 600 may receive user inputs selecting a different media stream, media source, cable TV channel, etc. If no such input has been received ("No" at 1110), then processing returns to 1106 where the control circuitry continues to identify objects in the first media stream.

If output of the first media stream has been replaced by output of the second media stream ("Yes" at 1110), then, at 1112, the control circuitry determines a second content type of the second media stream and, at 1114, selects at least one second classification model based on the second content type. The control circuitry then, at 1116, identifies objects in the second media stream using the at least one second classification model and, at 1118, generates for presentation information related to the identified objects. This may be accomplished using methods described above in connection with 1102-1108.

The actions and descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
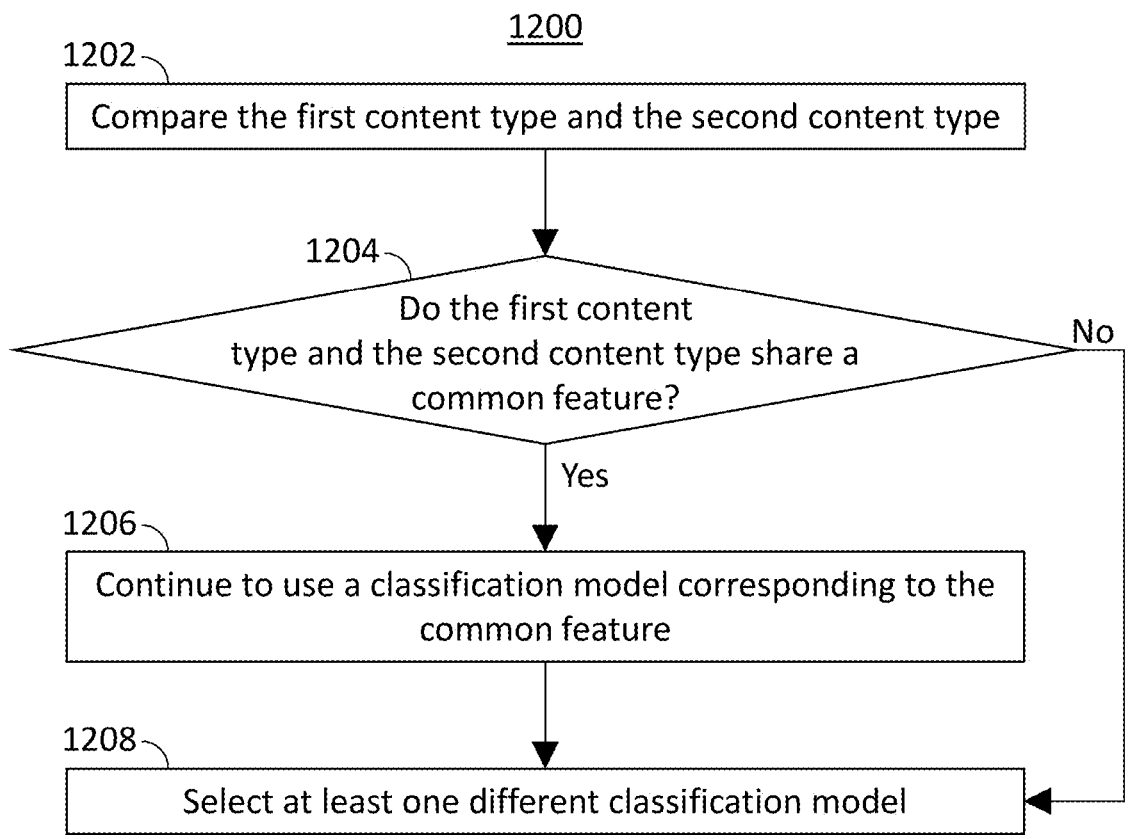
FIG. 12 is a flowchart representing a process for selecting different classification models for a different media stream, in accordance with some embodiments of the disclosure.

FIG. 12 is a flowchart representing a process 1200 for selecting different classification models for a different media stream, in accordance with some embodiments of the disclosure. Process 1200 may be implemented on control circuitry 510 or control circuitry 610. In addition, one or more actions of process 1200 may be incorporated into or combined with one or more actions of any other process or embodiment described herein.

At 1202, the control circuitry compares the first content type and the second content type. At 1204, the control circuitry determines whether the first content type and the second content type share a common feature. For example, the first content type may be sports analysis (e.g., EPSN Sports Center) and the second content type may be a live football game. As a general sports analysis program, the first content type may have features corresponding to multiple sports while the second content type, being a live football game, has features that correspond to football but not any other sports. In other examples, the first content type and the second content type may be completely unrelated and therefore share no common features.

If the first content type and the second content type share a common feature ("Yes" at 1204), then, at 1206, the control circuitry continues to use a classification model corresponding to the common feature. For example, if the first content type and the second content type have a football as a common feature, the classification model relating to football that is in use for the first media stream remains in use while use of other classification models being used for the first media stream is suspended or discontinued. Additionally, or if there are no common features ("No" at 1204), at 1208, the control circuitry selects at least one different classification model. This may be accomplished using methods described above in connection with FIG. 7.

The actions and descriptions of FIG. 12 may be used with any other embodiment of this disclosure. In addition, the actions and descriptions described in relation to FIG. 12 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for enabling user-specific real-time information services for identifiable objects in a video stream, the method comprising:
    determining a first genre of a first video stream being output;
    selecting at least one first classification model from a plurality of classification models based on the first genre, wherein each of the plurality of classification models is trained to identify, in visual content, one or more objects associated with a respective genre;
    identifying at least a first object in the first video stream using the at least one first classification model;
    selecting a first device from a plurality of devices for presenting information related to the first object;
    causing information related to the first object to be displayed at the first device;
    detecting that output of the first video stream has been replaced by output of a second video stream;
    determining a second genre of the second video stream;
    selecting at least one second classification model from the plurality of classification models based on the second genre, wherein the at least one second classification model is different from the at least one first classification model;
    identifying at least a second object in the second video stream using the at least one second classification model, wherein the at least one second classification model is not used in identifying the first object, and wherein the at least one first classification model is not used in identifying the second object;
    selecting a second device from the plurality of devices for presenting information related to the second object; and
    causing information related to the second object to be displayed at the second device.

2. The method of claim 1, wherein detecting that output of the first video stream has been replaced by output of the second video stream comprises detecting a channel change operation.

3. The method of claim 1, wherein detecting that output of the first video stream has been replaced by output of the second video stream comprises comparing an identifier of the first video stream with an identifier of a video stream currently being output.

4. The method of claim 1, wherein detecting that output of the first video stream has been replaced by output of the second video stream comprises detecting, during output of the first media stream, a selection of the second video stream.

5. The method of claim 1, further comprising receiving, from a server, the one or more classification models via a separate transmission from the first video stream or the second video stream.

6. The method of claim 1, further comprising retrieving, from a server, the one or more classification models based on a reference contained in a manifest file of the first video stream.

7. The method of claim 1, further comprising retrieving, from a server, the one or more classification models based on a reference contained in a manifest file of the second video stream.

8. The method of claim 1, further comprising generating for output a notification that an object has been identified.

9. The method of claim 1, wherein the first classification model is trained on a first data set to identify first types of objects associated with the first genre, and the second classification model is trained on a second data set to identify second types of objects associated with the second genre.

10. The method of claim 1, wherein:
    each of the first genre and the second genre comprise one of live-action, science fiction, news, science, or a content source; and
    the first genre and the second genre are different.

11. A system for enabling user-specific real-time information services for identifiable objects in a media stream, the system comprising:
input/output circuitry; and
control circuitry configured to:
determine a first genre of a first video stream being output;
select at least one first classification model from a plurality of classification models based on the first genre, wherein each of the plurality of classification models is trained to identify, in visual content, one or more objects associated with a respective genre;
identify at least a first object in the first video stream using the at least one first classification model;
select a first device from a plurality of devices for presenting information related to the first object;
cause information related to the first object to be displayed at the first device;
detect that output of the first media stream has been replaced by output of a second video stream;
determine a second genre of the second video stream;
select at least one second classification model from the plurality of classification models based on the second genre, wherein the at least one second classification model is different from the at least one classification model;
identify at least a second object in the second video stream using the at least one second classification model, wherein the at least one second classification model is not used in identifying the first object, and wherein the at least one first classification model is not used in identifying the second object;
select a second device from the plurality of devices for presenting information related to the second object; and
cause information related to the second object to be displayed at the second device.

12. The system of claim 11, wherein the control circuitry configured to detect that output of the first video stream has been replaced by output of the second video stream is further configured to detect a channel change operation.

13. The system of claim 11, wherein the control circuitry configured to detect that output of the first video stream has been replaced by output of the second video stream is further configured to compare an identifier of the first video stream with an identifier of a media stream currently being output.

14. The system of claim 11, wherein the control circuitry configured to detect that output of the first video stream has been replaced by output of the second video stream is further configured to detect, during output of the first video stream, a selection of the second video stream.

15. The system of claim 11, wherein the control circuitry is further configured to receive, from a server, using the input/output circuitry, the one or more classification models via a separate transmission from the first video stream or the second video stream.

16. The system of claim 11, wherein the control circuitry is further configured to retrieve, from a server, using the input/output circuitry, the one or more classification models based on a reference contained in a manifest file of the first video stream.

17. The system of claim 11, wherein the control circuitry is further configured to retrieve, from a server, using the input/output circuitry, the one or more classification models based on a reference contained in a manifest file of the second video stream.

18. The system of claim 11, wherein the control circuitry is further configured to generate for output a notification that an object has been identified.

19. The system of claim 11, wherein the first classification model is trained on a first data set to identify first types of objects associated with the first genre, and the second classification model is trained on a second data set to identify second types of objects associated with the second genre.

20. The system of claim 11, wherein:
each of the first genre and the second genre comprise one of live-action, science fiction, news, science, or a content source; and
the first genre and the second genre are different.

* * * * *